Figure 1:
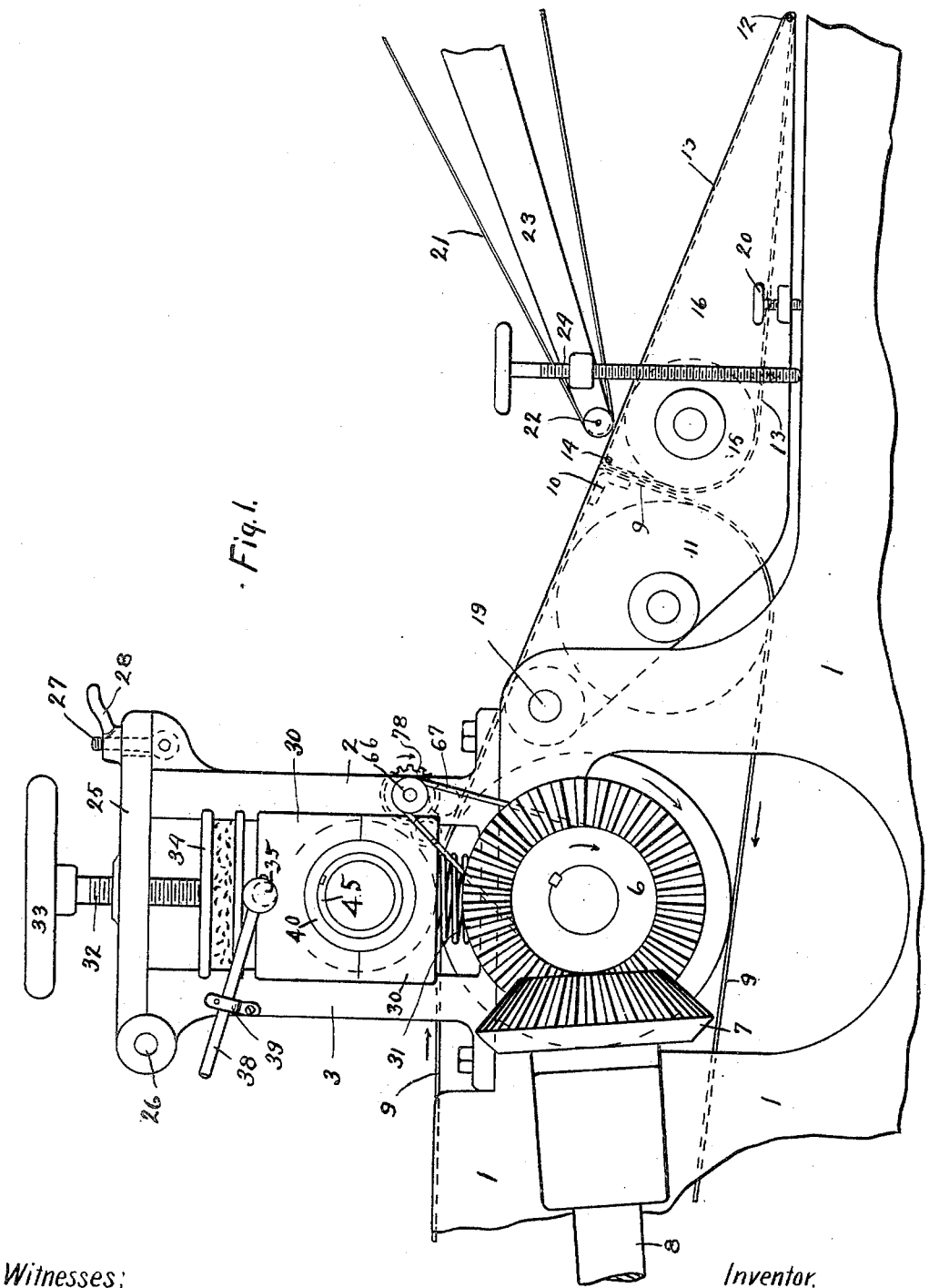

No. 642,220. Patented Jan. 30, 1900.
T. L. GREEN.
MACHINE FOR CUTTING AND SHAPING CRACKERS OR OTHER PLASTIC MATERIALS.
(Application filed Apr. 4, 1899.)
(No Model.) 5 Sheets—Sheet 1.

Witnesses:
R. D. Hawkins
M. C. Buck

Inventor.
Thomas L. Green
By V. H. Lockwood
His Attorney.

No. 642,220. Patented Jan. 30, 1900.
T. L. GREEN.
MACHINE FOR CUTTING AND SHAPING CRACKERS OR OTHER PLASTIC MATERIALS.
(Application filed Apr. 4, 1899.)
(No Model.) 5 Sheets—Sheet 3.

Witnesses:
R D Hawkins
M. C. Buck

Inventor.
Thomas L. Green,
By V. H. Lockwood
His Attorney.

No. 642,220. Patented Jan. 30, 1900.
T. L. GREEN.
MACHINE FOR CUTTING AND SHAPING CRACKERS OR OTHER PLASTIC MATERIALS.
(Application filed Apr. 4, 1899.)
(No Model.) 5 Sheets—Sheet 4.

Witnesses:
R D Hawkins
M. C. Buck

Inventor.
Thomas L. Green
By V. H. Lockwood
His Attorney.

No. 642,220. Patented Jan. 30, 1900.
T. L. GREEN.
MACHINE FOR CUTTING AND SHAPING CRACKERS OR OTHER PLASTIC MATERIALS.
(Application filed Apr. 4, 1899.)
(No Model.) 5 Sheets—Sheet 5.

Witnesses:
R D Hawkins
M. C. Buck

Inventor.
Thomas L Green
By V H Lockwood
His Attorney.

THE NORRIS PETERS CO., PHOTO-LITHO., WASHINGTON, D. C.

UNITED STATES PATENT OFFICE.

THOMAS L. GREEN, OF INDIANAPOLIS, INDIANA.

MACHINE FOR CUTTING AND SHAPING CRACKERS OR OTHER PLASTIC MATERIALS.

SPECIFICATION forming part of Letters Patent No. 642,220, dated January 30, 1900.

Application filed April 4, 1899. Serial No. 711,677. (No model.)

*To all whom it may concern:*

Be it known that I, THOMAS L. GREEN, of Indianapolis, county of Marion, and State of Indiana, have invented a certain new and useful Machine for Cutting and Shaping Crackers or other Plastic Material; and I do hereby declare that the following is a full, clear, and exact description thereof, reference being had to the accompanying drawings, in which like numerals refer to like parts.

This invention relates to improvements in a machine for cutting dough for crackers, cakes, &c., and imparting a design to the dough.

One feature consists in providing a perforated hollow rotary die or die rotatably mounted with means for introducing compressed air or gas into the hollow of the die, so that the air or gas will clean the dough from the die as fast as it is operated on. For this purpose I mount within the rotary cylinder carrying the dies a stationary air-tube large enough to maintain a rather close contact with the interior of the die or cylinder and place a groove or preferably a series of perforations in line with each other for the length of the dies and on the lower side of the tube at such place as will enable the air or gas issuing from said air-tube to pass through the perforations in the die-cylinder and engage the dough immediately after it has passed between the dies and conveyer and received the impression of the design. The dies are perforated miscellaneously, so that at all times there will be some perforations of the die that will register with the outlet of the air-tube. This cleans the dough from the die without breaking or disfiguring it.

Another feature is to combine a little brush with the rotary die, so that it will engage the die and brush it and at the same time tend to remove the dough from the die. Coöperating with the air-tube is a light roller to hold the crackers, cakes, &c., from displacement by the air-blast through the die. This makes a smooth clear-cut design impressed in the dough and permits great freedom in designing the dies, as the dough will be removed although the surface of the die may be considerably depressed at some points.

Another feature of this invention consists in providing an auxiliary apron or conveyer to coöperate with the main apron or conveyer in conveying the dough after it has passed under the dies to the receptacle for the crackers, cakes, &c.

The full nature of my invention will appear from the accompanying drawings and the description and claims following.

Figure 2:
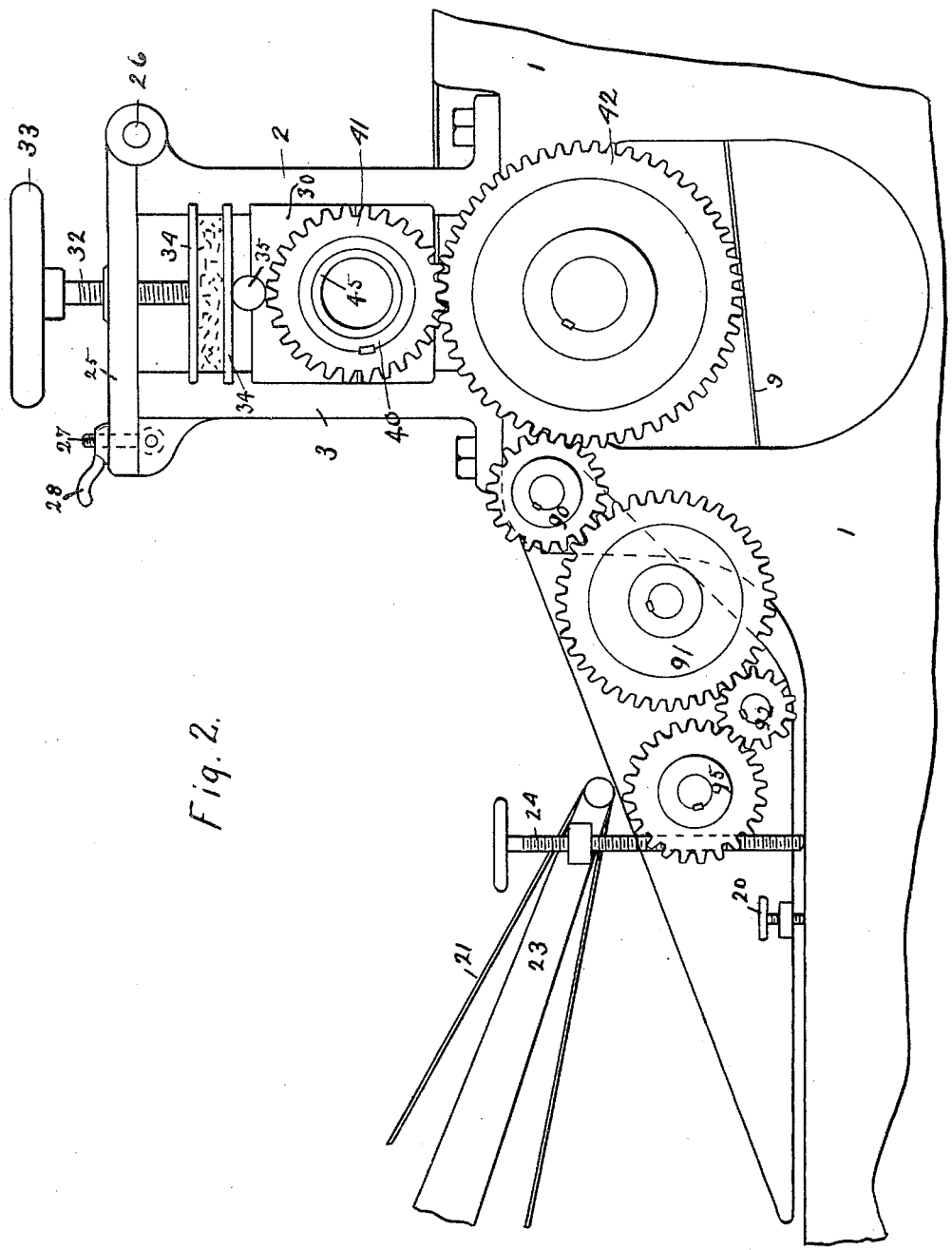
Figure 3:
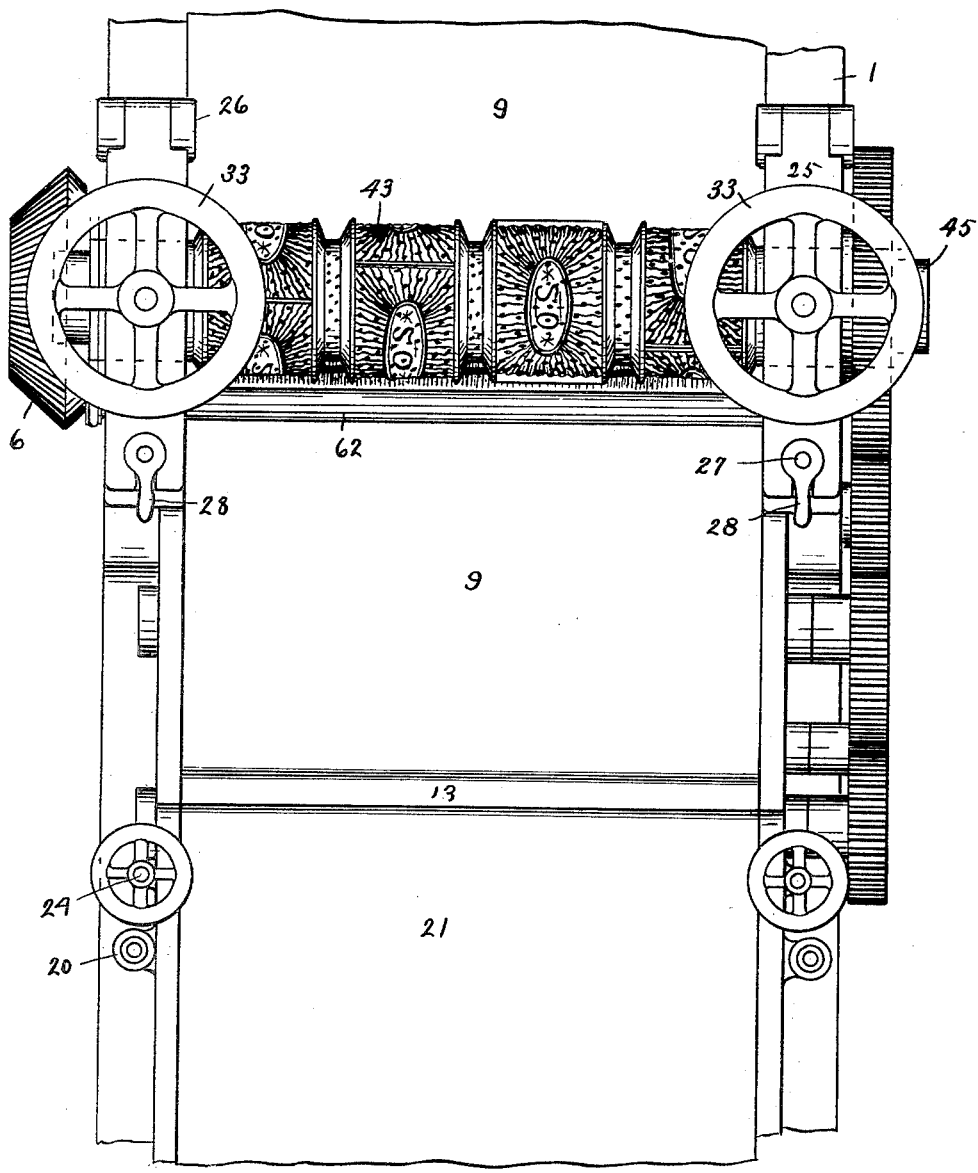
Figure 4:
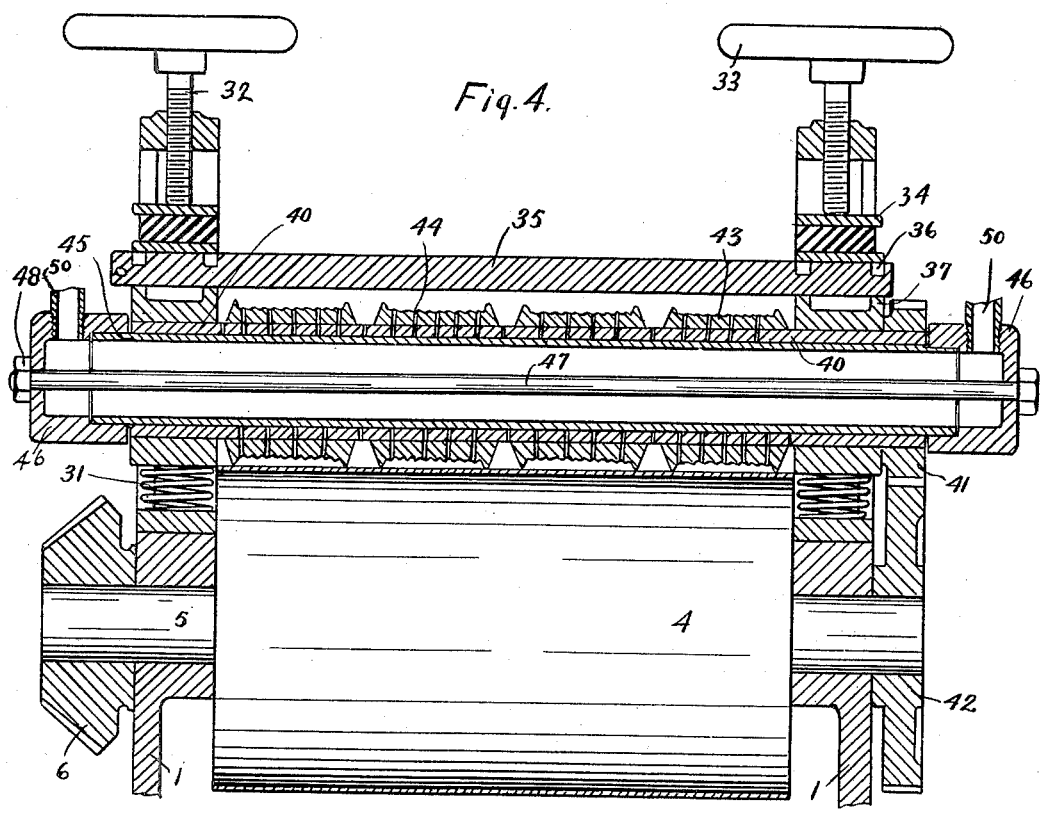
Figure 5:
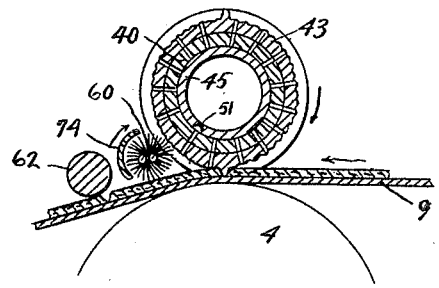
Figure 6:
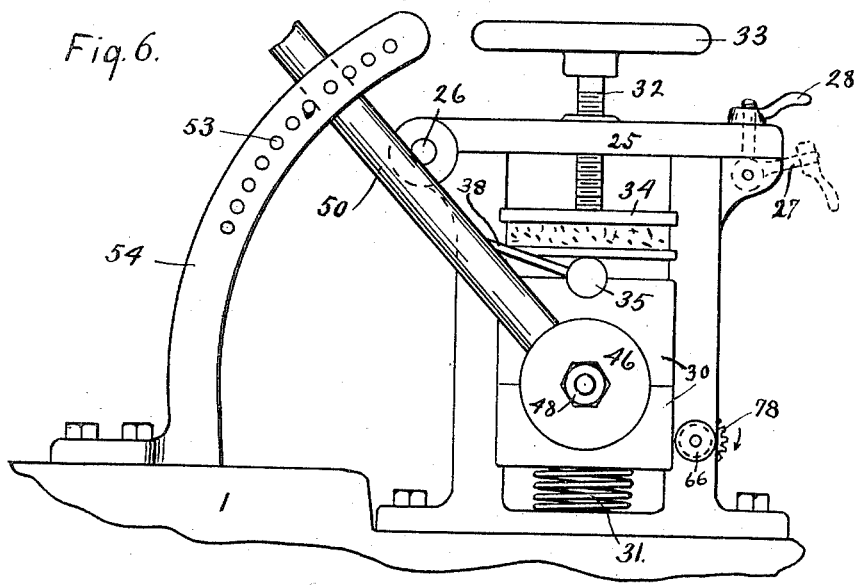
Figure 9:
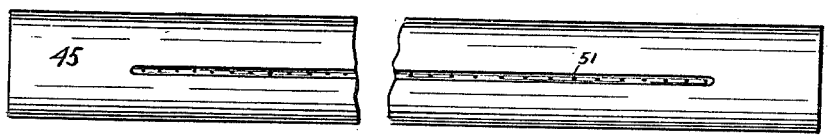
Figure 8:
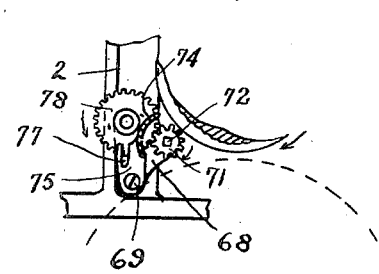
Figure 7:
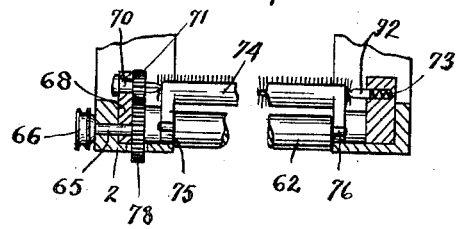

In the drawings, Figure 1 is an elevation of a portion of the right-hand side of a cracker-machine, showing my improvements therein. Fig. 2 is an elevation of the left-hand side of the same portion of the machine. Fig. 3 is a plan of the same portion of the machine. Fig. 4 is a vertical section of said portion of the machine centrally through the die-cylinder and roller beneath. Fig. 5 is a vertical cross-section of the die, conveyer, dough, brush, and accompanying roller. Fig. 6 is an end elevation with a part of the means for supplying air to the air-tube within the dies in place. Fig. 7 is a plan of the brush and the gravity-roller, together with the means for mounting and driving the same, parts being broken away. Fig. 8 is an inside elevation of the driving-gears shown in Fig. 7. Fig. 9 is a plan of the air-tube turned over with the outlet upward.

In detail the machine is provided with a frame 1, suitable for carrying the various parts of the mechanism. As stated, I show a portion only of the end of a cracker-machine. Suitably mounted in the frame there is a roller 4, as seen in Fig. 4, carrying on one end of its spindle 5 a bevel-gear 6, that is driven by the bevel-gear 7 on the shaft 8. (To be seen in Fig. 1.) Over this roller an apron or conveyer 9 passes, extending about the angle-iron 10 and the roller 11. The sheet of dough is carried to the dies by this conveyer or apron in the direction indicated by the arrows. Heretofore this apron or conveyer 9 has been extended to pass about the small roller 12; but since said apron in a cracker-machine is very long and subjected to considerable strain and the roller 12 must be small it quickly cuts or wears out in passing around said small roller and renders the life of the apron very short. Also the best form of said apron or conveyer 9 now consists of two thicknesses of material glued together. It is obvious that the glue would break as the apron passes over a very small roller like 12, and thus the two thicknesses would be separated and the apron rendered useless. I have remedied these difficulties by letting the long apron 9 turn down over the rounded corner of the angle-iron 10, whose ends are secured to the framework, so that the apron passes over no small roller or sharp surface. I provide an auxiliary apron or conveyer 13, that passes about the small rollers 12 and 14 and is actuated by the driving-roller 15. The small roller 14 is placed close to and in line with the angle-iron 10, so that the top abutting aprons or conveyers will present their top surfaces in line with each other and without any perceptible stop or break between them, so that the crackers will be conveyed from one to the other without any injury or difficulty. The frame 16, in which the auxiliary apron is mounted, is hinged to the main frame at 19, and its free end is adjusted by the set-screws 20. The cakes, crackers, &c., are discharged from the small end of the auxiliary conveyer upon any suitable receptacle for removal.

I provide a scrap elevator or conveyer 21, that passes about the roller 22, so as to be in rather close engagement with the auxiliary conveyer or apron 13. The roller 22 is carried in the frame 23, which is rendered adjustable by the screw-bolt 24, whose lower end rests on the main frame. This scrap-removing device is old. It takes up any scraps that may be passing down on the conveyers, catching them by their upturned corners and conveying them to a separate receptacle.

Turning now to the main feature of my invention, there will be observed a frame consisting of the uprights 2 and 3, mounted on the main frame. Said uprights at their upper ends are held together by a cross-piece 25, hinged to the upright 3 at 26 and held down on the upright 2 by the bolt 27 and the nut 28, with the finger-piece thereon. The bolt 27 is pivoted at its lower end, so as to turn down or up through a slot in the end of the piece 25, as illustrated in Figs. 3 and 6.

A journal formed of two bearing-blocks 30, as shown in Fig. 1, is slidably mounted between the uprights 2 and 3 and is spring-supported by the spiral spring 31. It is pressed down by the screw 32, which has a hand-wheel 33 on its upper end and passes through a hole in the bar 25, which is provided with suitable internal threads. The screw 32 bears upon a cushioned sliding block 34 between the uprights 2 and 3 and is formed of two plates, with a cushion of rubber between, and between the blocks 34 and the bearing-blocks 30 a cam is interposed, whereby the bearing-blocks may be quickly relieved and permitted to move upward in an emergency. Therefore I show in Fig. 4 a rod 35, loosely mounted in semicircular seats in the bearing-blocks 30, as seen in Fig. 1. Each end of the rod 35 has on one side cross-grooves 36, that are adapted, when the rod is rotated, to register with and receive the upwardly-extending flanges 37 on the bearing-blocks 30. When the rod 35 is in the position shown in Fig. 4, it presses the bearing-blocks 30 down as far as it can. When the rod 35 is rotated, the grooves 36 are turned downward, so that the extensions 37 on the bearing-blocks can enter them as the bearing-block is pushed upward by the spring 31. Any other cam interposed between the blocks 30 and 34 could accomplish the same purpose provided the cams on each side are connected so as to cooperate. The rod 35 is rotated by the hand-lever 38, which normally rests in the bracket 39, secured to the upright 3, as shown in Fig. 1.

In the bearing-blocks 30 I mount a die-cylinder 40. It is rotated by the gear 41, that meshes with the gear 42 on the shaft 5. A series of cylindrical dies 43 are rigidly mounted on the die-cylinder 40. The die-cylinder and dies are hollow and provided miscellaneously with perforations 44 through them, as shown in Figs. 3 and 4.

Within the die-cylinders I mount the stationary air-tube 45. Its ends extend beyond the ends of the die-cylinder and have separable heads or caps 46 on them, held in place by the rod 47, that extends through the air-tube and draws both heads toward each other by the nuts 48. This air-tube 45 is supplied with air through the air-pipes 50, leading from any suitable source of air under pressure. (Not shown.) These air-pipes 50 hold the air-tube 45 stationary, as shown in Fig. 6, the air-pipes 50 being rigid. The air-tube 45 has a series of perforations opening into a groove 51, extending almost from one end to the other in a straight line and on its under side. This groove and series of perforations furnish the exit of the compressed air in the air-tube, the air passing through them and through such of the perforations 44 as may at any time register with the perforations and groove in the air-tube 45. In this way the dough is forced away from the die. This must be done after the die has made its impression on the dough, and since such impression is made as the dough passes between the die and the conveyer the perforations and groove 51 are placed behind the line of contact of the die and conveyer.

The position of the perforations and groove 51 is rendered adjustable by the means shown in Fig. 6. As there shown, the air-pipe 50 is inflexible, and its outer end is supported on pins adapted to fit in a series of apertures 53 in the curved upwardly-extending arm 54, secured to the frame of the machine. The rigid air-pipe 50 may be lowered or elevated by removing or replacing the pin supporting it, and when done the air-tube 45 is turned somewhat, and thus the position of the air-outlet therefrom is adjusted. The reason for providing an outlet by means of the outer groove and an inner series of perforations in the air-pipe is to enable the air to reach a greater number of the perforations 44 in the die and die-cylinder. The air first passes through the perforations in the air-tube 45. Then it distributes itself lengthwise through the groove in the air-pipe and reaches all perforations in the die or die-cylinder that are laterally in line with the groove.

It is observed that the perforations extend through the die-cylinders between the dies, where they are mounted in series, as shown herein, especially in Fig. 4. These perforations remove the scrap between the dies, and the scrap leaves the dies in long continuous strips, which when started up on the scrap-apron 21 continue to be removed by it.

To clean the die after the dough has left it and also, if necessary, to assist in removing the dough from the die, I provide a rotary brush 60, (to be seen in Fig. 5,) that rotates in the same direction as the die. It is so placed as to engage the die immediately after the cake or cracker should have left the die, and hence immediately after the air-outlet from the tube within the die. This cleans the surface of the die, and if a cake should resist the action of the outcoming air and fail to free itself the brush would remove it.

Immediately behind the brush I mount a roller 62 of light weight and adapted to rest on the cakes or dough passing beneath it merely by gravity. Its function is to hold the cakes or crackers down on the apron against the action of the air-blast through the dies. The brush and roller just referred to are mounted, as shown in Figs. 6, 7, and 8, between the uprights 2. As seen in Fig. 7, a spindle 65 extends through the rib of the upright and carries on its outer end a pulley 66, driven by a cord or belt 67, as seen in Fig. 1, that in turn fits in a groove in the inner face of the bevel-wheel 6, as seen in Fig. 4, and is driven thereby. The spindle 65 carries on its inner end a gear 78. On the inner side of the upright 2 a triangular-shaped bracket 68 is secured, the spindle 65 extending through its upper end and its lower end held in place by the screw 69. In the other angle of this bracket 68 a spindle 70 is mounted, carrying a pinion 71. The inner end of the spindle 70 is squared to receive the pinion 71 and to fit into the square aperture 72 in the end of the brush 60, and thereby rotate it. At the other end the spindle 72 is round and spring-pressed by the spring 73. With this construction the brush can be readily removed by shifting it endwise to the right until it has become disengaged from the spindle 70 at the other end. Behind the brush I mount a shield 74, that is held in place by an arm 75, which is fastened by the screws 69 to the upright 2. The roller 62 has in its ends pins 76, that drop into the vertical slot 77 in the arm 75, as seen in Fig. 8.

The function of the stiffening-shield 74 is to stiffen or reinforce the brush to hold it throughout its length against the dies, as the brush is long and liable to bend unless held in place by this rigid shield.

What I claim as my invention, and desire to secure by Letters Patent, is—

1. A machine for cutting and shaping crackers and other plastic material including a conveyer, a hollow perforated rotary die, and means for forcing air through the perforations in the die to remove the material therefrom.

2. A machine for cutting and shaping crackers and other plastic material including a conveyer, a hollow rotary die miscellaneously perforated and with closed ends, and means for introducing compressed air into the hollow die.

3. A machine for cutting and shaping crackers and other plastic material including a conveyer, a rotary hollow die-cylinder closed at its ends and provided with perforations, one or more dies mounted thereon with perforations registering with those in the cylinder, and means for introducing compresed air into the cylinder.

4. A machine for cutting and shaping crackers and other plastic material including a conveyer, a rotary hollow die-cylinder closed at its ends, a plurality of dies mounted thereon, perforations being made through the cylinder and dies and through the cylinder between the dies, and means for introducing compressed air into the cylinder.

5. A machine for cutting and shaping crackers and other plastic material including a conveyer, a rotary hollow perforated die-cylinder, a stationary air-tube fitting snugly within the cylinder and with an outlet that can register with the perforations in the cylinders, and means for introducing compressed air into the air-tube.

6. A machine for cutting and shaping crackers and other plastic material including a conveyer, a rotary hollow perforated die-cylinder, a stationary air-tube fitting snugly within the cylinder with an outlet extending along a line longitudinal therewith, and means for introducing compressed air into the air-tube.

7. A machine for cutting and shaping crackers and other plastic material including a conveyer, a rotary hollow perforated die-cylinder, a stationary air-tube fitting snugly within the cylinder with a groove in the outside of the tube extending longitudinal therewith and perforations in the air-tube at said groove, and means for introducing compressed air into the air-tube.

8. A machine for cutting and shaping crackers and other plastic material including a conveyer, a rotary hollow perforated die-cylinder, a stationary air-tube fitting snugly within the cylinder with an outlet to the perforations in the die-cylinder and with its ends extending beyond the ends of the die-cylinder, caps for closing the ends of the air-tube held in place by a bolt extending through said tube, and a pipe or tube from some suitable source of compressed air extending into the cap at the end.

9. A machine for cutting and shaping crackers and other plastic material including a conveyer, a rotary hollow perforated die-cylinder, an air-tube fitting snugly within the cylinder with an outlet to the perforations in the cylinder extending in a line horizontally therewith, means for introducing compressed air into said air-tube, and means for adjusting the position of the outlet from the air-tube by turning said tube and for holding it stationary when adjusted.

10. A machine for cutting and shaping crackers and other plastic material including a conveyer, a perforated rotary cylindrical die, means for forcing air through said perforations for removing the dough therefrom, a brush so mounted as to engage the die behind the air-blast therethrough, and means for rotating the brush in the same direction as the die.

11. A machine for cutting and shaping crackers and other plastic material including a conveyer, a perforated rotary cylindrical die, means for forcing air through said perforations for receiving the dough therefrom, a brush so mounted as to engage the die behind the air-blast therethrough, means for rotating the brush in the same direction as the die, and a stiffening-shield mounted close behind the brush whereby the brush will be held throughout its length against the dies.

12. A machine for cutting and shaping crackers and other plastic material including a conveyer, a cylindrical rotary perforated die, means for forcing air through the perforations, and a roller so mounted as to hold the crackers, cakes, &c., by its gravity after they have left the die.

13. A machine for cutting and shaping crackers and other plastic material including a rotary die, a conveyer to transport the dough beneath said die that is inclined downward somewhat after it leaves the die, a rib or angle-bar at the end of the conveyer with a rounded edge over which the conveyer moves, an auxiliary conveyer, a small roller at each end of said auxiliary conveyer to hold it close to the end of the main conveyer and in line therewith, and means for actuating said conveyers.

In witness whereof I have hereunto affixed my signature in the presence of the witnesses herein named.

THOMAS L. GREEN.

Witnesses:
V. H. LOCKWOOD,
M. C. BUCK.